(12) United States Patent
Chang et al.

(10) Patent No.: US 7,360,940 B2
(45) Date of Patent: Apr. 22, 2008

(54) BACKLIGHT MODULE WITH MEANS FOR FIXING CIRCUIT BOARD TO LIGHT GUIDE PLATE

(75) Inventors: Hsueh Tien Chang, Miao-Li (TW); Ching-Tung Hsieh, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 198 days.

(21) Appl. No.: 11/301,013

(22) Filed: Dec. 12, 2005

(65) Prior Publication Data

US 2006/0126361 A1    Jun. 15, 2006

(30) Foreign Application Priority Data

Dec. 10, 2004   (TW) ............................... 93219894 U

(51) Int. Cl.
*F21V 7/04* (2006.01)

(52) U.S. Cl. ...................... 362/631; 362/633; 362/634; 349/58

(58) Field of Classification Search ........ 362/630–634; 349/58; 385/901
See application file for complete search history.

(56) References Cited

U.S. PATENT DOCUMENTS 5,727,862 A * 3/1998 Wu .............................. 362/27
6,961,103 B2   11/2005 Sung et al.

* cited by examiner

*Primary Examiner*—Stephen F Husar
(74) *Attorney, Agent, or Firm*—Wei Te Chung

(57) ABSTRACT

An exemplary backlight module (5) includes a light guide plate (54) having a light incident surface (546), and a circuit board (62) disposed adjacent to the light incident surface. A pair of protrusions (544) of the light guide plate engages in a pair of fixing holes (524) of the circuit board, thereby fixing the circuit board and the light guide plate together. The backlight module may further include one or more optical films. In such case, the above-described fixing means may further include a plurality of side-blocks or a plurality of corner-blocks integrally formed on a light emitting surface of the light guide plate. The side-blocks or corner-blocks enable the optical films to be tightly held on the light guide plate without gaps therebetween.

10 Claims, 6 Drawing Sheets

BACKLIGHT MODULE WITH MEANS FOR FIXING CIRCUIT BOARD TO LIGHT GUIDE PLATE

FIELD OF THE INVENTION

The present invention relates to backlight modules, and especially to a backlight module for liquid crystal display (LCD) devices.

BACKGROUND

Liquid crystal displays are commonly used as display devices for compact electronic apparatuses, because they not only provide good quality images with little power but also are very thin. The liquid crystals in a liquid crystal display do not emit any light themselves. The liquid crystals have to be lit by a light source so as to clearly and sharply display text and images. Thus, a backlight module for an LCD is generally needed.

FIG. 9 is a schematic, exploded view of a conventional backlight module. The backlight module 1 includes two prism films 16, a diffusing film 15, a light guide plate 14, a plastic frame 17, a reflective film 13, and a bottom tray 18 arranged top to bottom in that order. The light guide plate 14 includes a light incident surface 141, and a light emitting surface 142 adjoining the light incident surface 141. The diffusing film 15 and the prism films 16 are disposed adjacent to the light emitting surface 142 of the light guide plate 14. The backlight module 1 further includes a flexible printed circuit (FPC) 12, and three light emitting diodes (LED) 11 connected with the FPC 12. The FPC 12 provides power for the LEDs 11. The LEDs 11 are disposed adjacent to the light incident surface 141 of the light guide plate 14. Light beams emitted by the LEDs 11 enter the light guide plate 14 through the light incident surface 141, and then are emitted from the light emitting surface 142.

The FPC 12 is arranged adjacent to the light incident surface 141 of the light guide plate 14, and the diffusing film 15 and the prism films 16 are arranged on the light emitting surface 142 of the light guide plate 14. It is difficult to obtain an exact fit when assembling the FPC 12, the diffusing film 15, and the prism films 16 together. Further, even if a compact assembly is attained, the assembly may loosen and become unstable when the backlight module 1 is used.

What is needed, therefore, is a backlight module in which the FPC and optical films thereof are compactly and stably assembled together, preferably without any gaps therebetween.

SUMMARY

In at least one preferred embodiment, a backlight module includes a light guide plate having a light incident surface, a circuit board disposed adjacent to the light incident surface, one or more optical films stacked on the light guide plate, and a fixing means securing the circuit board, the light guide plate and the optical films together.

The fixing means can firmly fix the light guide plate, the circuit board and the optical films together. Thereby, gaps between the optical films and the light guide plate can be avoided.

Other advantages and novel features will become more apparent from the following detailed description of preferred embodiments when taken in conjunction with the accompanying drawings, in which:

DETAILED DESCRIPTION OF PREFERRED EMBODIMENTS

Reference will now be made to the drawings to describe the preferred embodiments in detail.

Figure 1:
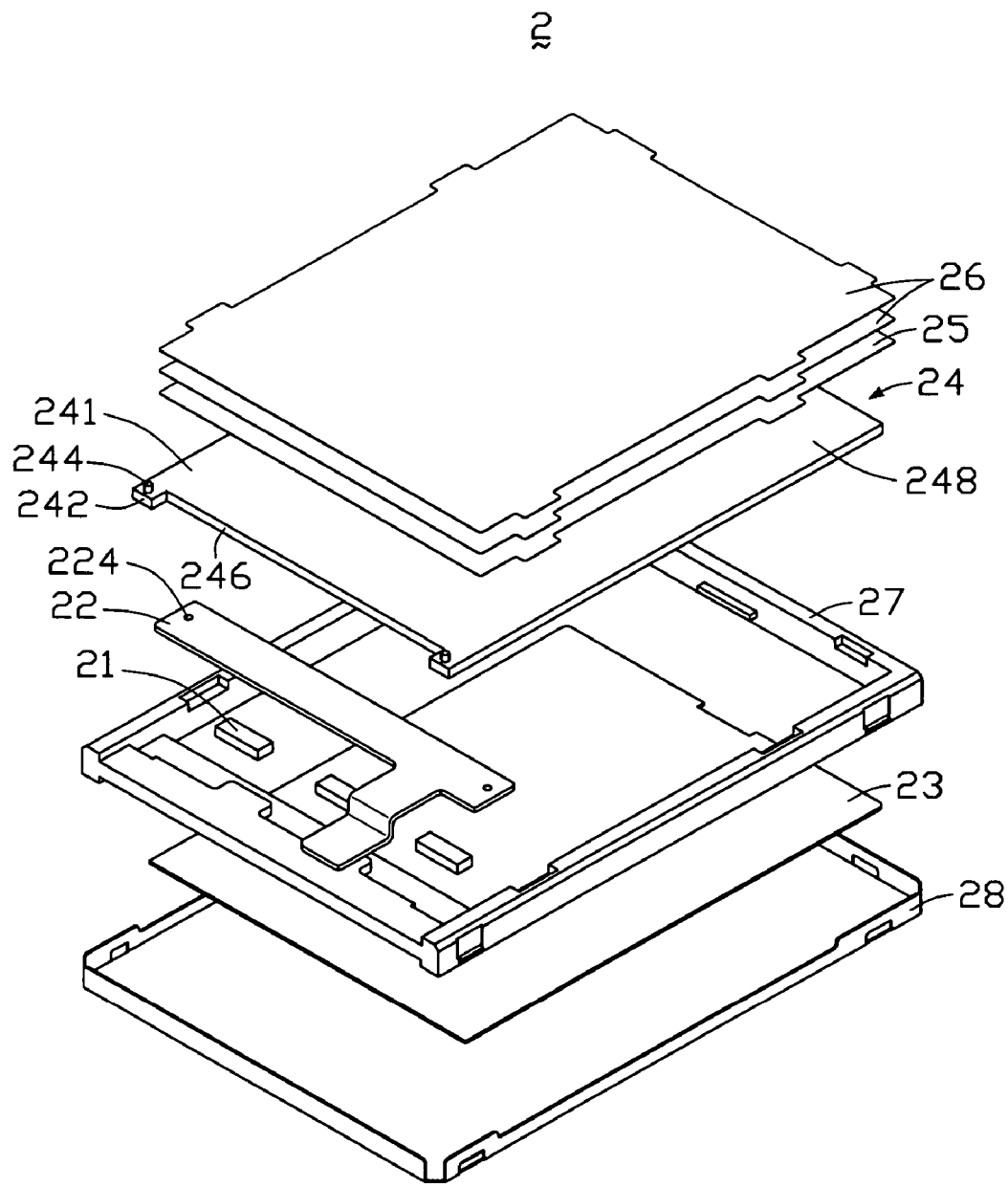
FIG. 1 is an exploded, isometric view of a backlight module according to a first embodiment of the present invention.

FIG. 1 is an exploded, isometric view of a backlight module according to a first embodiment of the present invention. The backlight module 2 includes two prism films 26, a diffusing film 25, a light guide plate 24, a plastic frame 27, a reflective film 23, and a bottom tray 28 arranged in that order. The light guide plate 24 includes a transparent sheet 241 and two ears 242. The transparent sheet 241 includes a light incident surface 246, and a light emitting surface 248 adjoining the light incident surface 246. Each ear 242 extends from a respective end of the light incident surface 246, and includes a protrusion 244. The diffusing film 25 and the prism films 26 are arranged adjacent to the light emitting surface 248.

The backlight module 2 further includes a circuit board 22, and three light emitting diodes (LED) 21 arranged on the circuit board 22. The circuit board 22 can be a flexible printed circuit (FPC) or a printed circuit board (PCB), and provides power for the LEDs 21. The LEDs 21 are disposed adjacent to the light incident surface 246 of the light guide plate 24. The circuit board 22 is adjacent to the light guide plate 24 at the light incident surface 246, with part of the circuit board 22 overlapping the light emitting surface 248. The circuit board 22 defines two fixing holes 224 corresponding to the protrusions 244.

Figure 2:
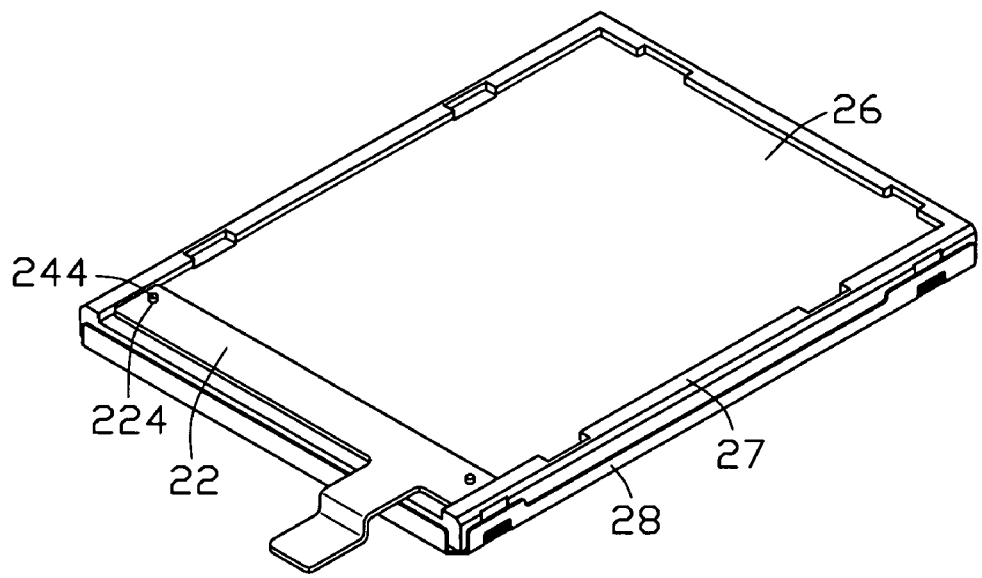
FIG. 2 is an assembled view of the backlight module of FIG. 1.

FIG. 2 is an assembled view of the backlight module 2. The protrusions 244 are engaged in the fixing holes 224, thereby firmly fixing the circuit board 22 and the light guide plate 24 together.

Figure 3:
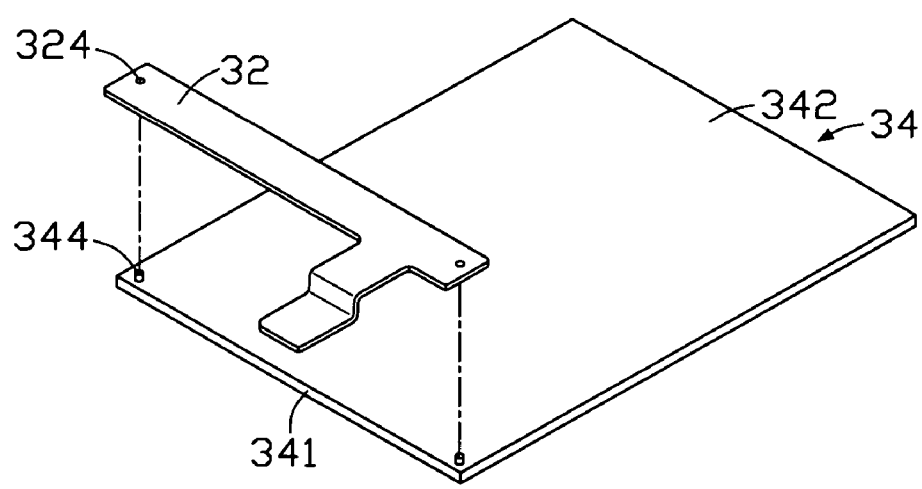
FIG. 3 is an exploded, isometric view of a light guide plate and a circuit board of a backlight module according to a second embodiment of the present invention.

FIG. 3 is an exploded, isometric view of a light guide plate 34 and a circuit board 32 of a backlight module 3 according to a second embodiment of the present invention. The light guide plate 34 includes a light incident surface 341, and a light emitting surface 342 adjoining the light incident surface 341. Two protrusions 344 are integrally formed on two corners respectively of the light emitting surface 342 that are adjacent to the light incident surface 341. The circuit board 32 defines two fixing holes 324 corresponding to the protrusions 344. The protrusions 344 are engagingly received in the fixing holes 324, thereby firmly fixing the circuit board 32 and the light guide plate 34 together.

Figure 4:
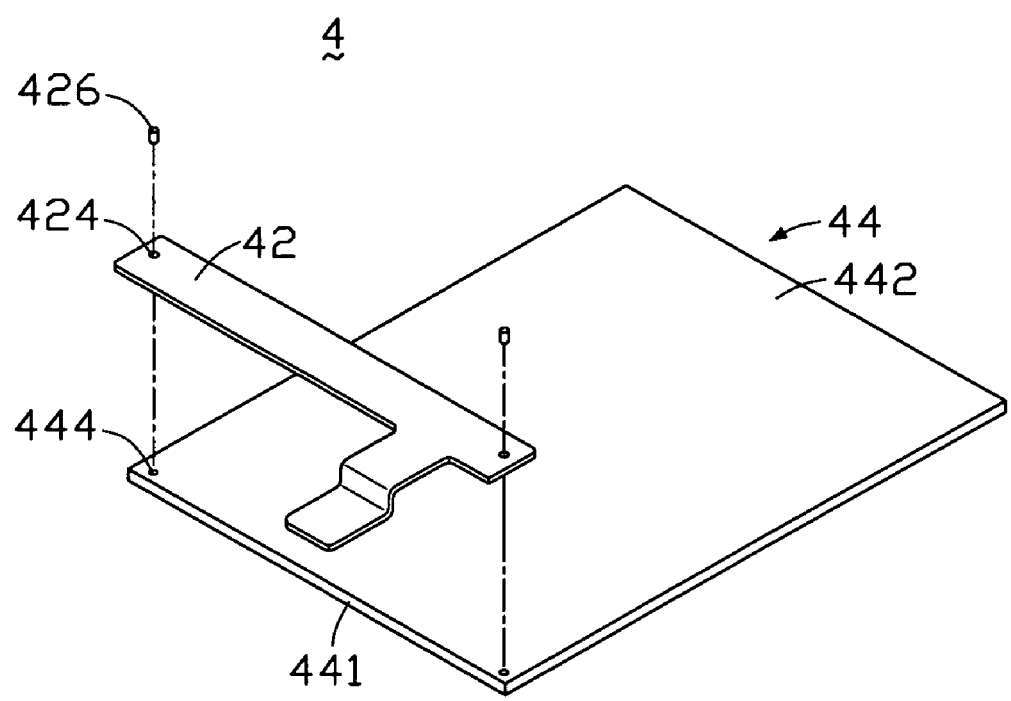
FIG. 4 is an exploded, isometric view of a light guide plate and a circuit board of a backlight module according to a third embodiment of the present invention.

FIG. 4 is an exploded, isometric view of a light guide plate 44 and a circuit board 42 of a backlight module 4 according to a third embodiment of the present invention. The circuit board 42 defines two fixing holes 424 in two ends thereof respectively. The light guide plate 44 includes a light incident surface 441, and a light emitting surface 442 adjoining the light incident surface 441. The light guide plate 44 defines two fixing holes 444 in two corners thereof that are adjacent to the light incident surface 341 respectively. The fixing holes 444 correspond to the fixing holes 424. The backlight module 4 further includes two fasteners such as bolts 426. The bolts 426 are engaged in the fixing holes 424, 444, thereby firmly fixing the light guide plate 44 and the circuit board 42 together.

Figure 5:
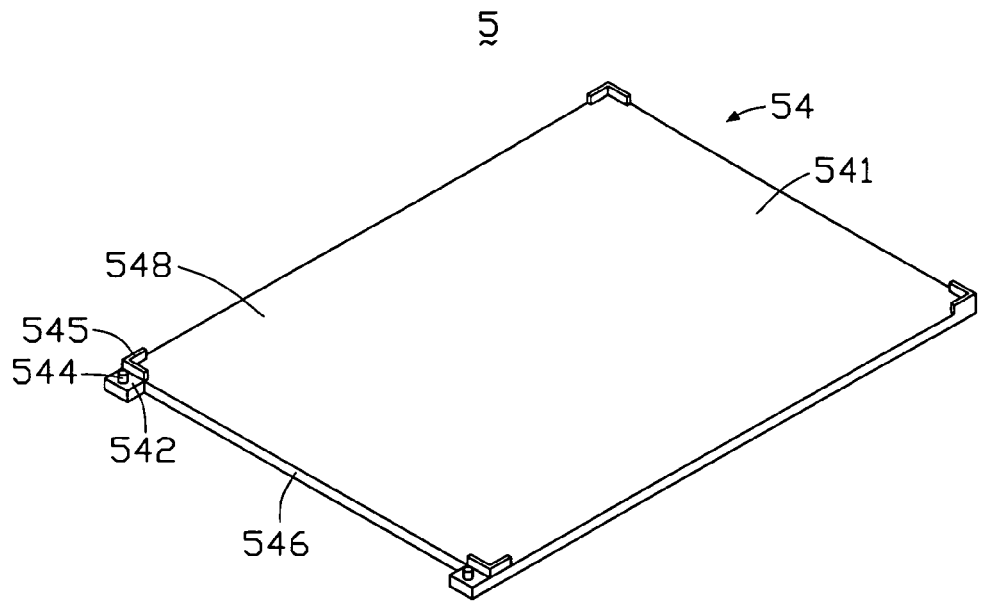
FIG. 5 is an isometric view of a light guide plate of a backlight module according to a fourth embodiment of the present invention.
Figure 6:
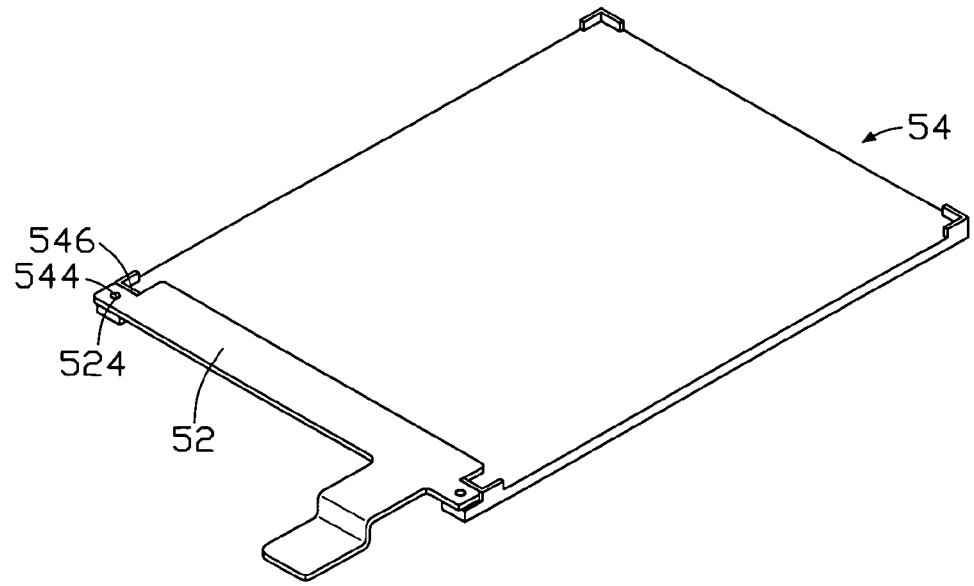
FIG. 6 is similar to FIG. 5, but showing a circuit board attached onto an end of the light guide plate.

Referring to FIG. 5 and FIG. 6, a backlight module 5 according to a fourth embodiment of the present invention includes a light guide plate 54 and a circuit board 52. The light guide plate 54 includes a transparent sheet 541, two ears 542, and four L-shaped corner-blocks 545. The transparent sheet 541 includes a light incident surface 546, and a light emitting surface 548 adjoining the light incident surface 546. Each ear 542 extends from a respective end of the light incident surface 546, and includes a protrusion 544. The circuit board 52 defines two fixing holes 524 corresponding to the protrusions 544 of the light guide plate 54. The L-shaped corner-blocks 545 are disposed at four corners respectively of the light emitting surface 548. The backlight module 5 typically also includes a plurality of optical films (not shown) disposed on the light emitting surface 548 of the light guide plate 54. The L-shaped corner-blocks 545 facilitate firm fixing of the circuit board 52 and the light guide plate 34 together, and also enable the optical films to be tightly held on the light guide plate 54 without gaps therebetween. The transparent sheet 541, the protrusions 544, and the L-shaped corner-blocks 545 are integrally formed together.

Figure 7:
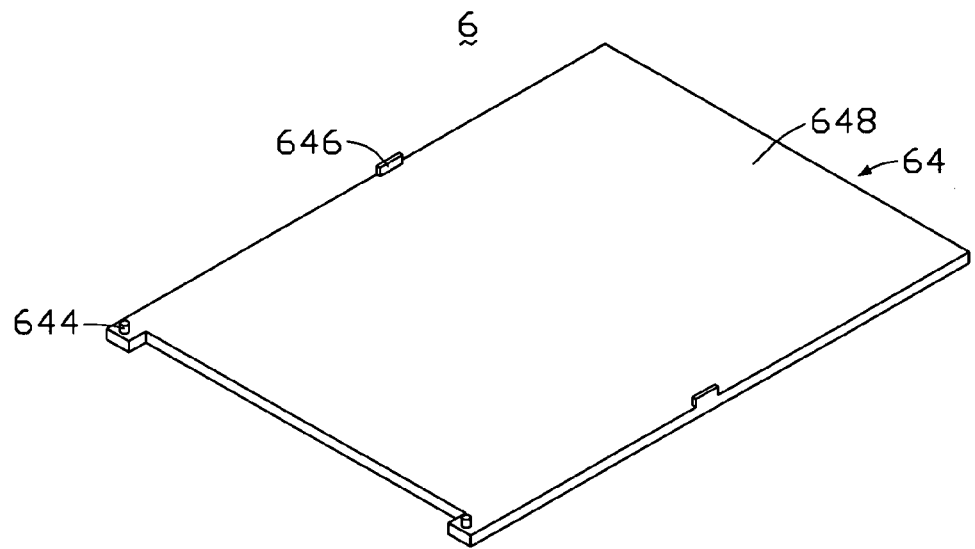
FIG. 7 is an isometric view of a light guide plate of a backlight module according to a fifth embodiment of the present invention.
Figure 8:
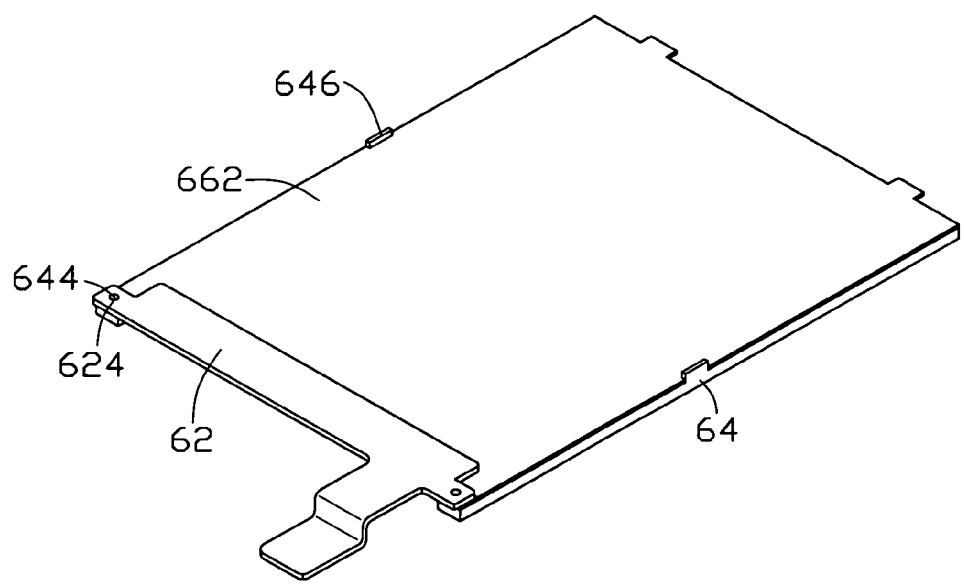
FIG. 8 is similar to FIG. 7, but showing a circuit board attached onto an end of the light guide plate.
Figure 9:
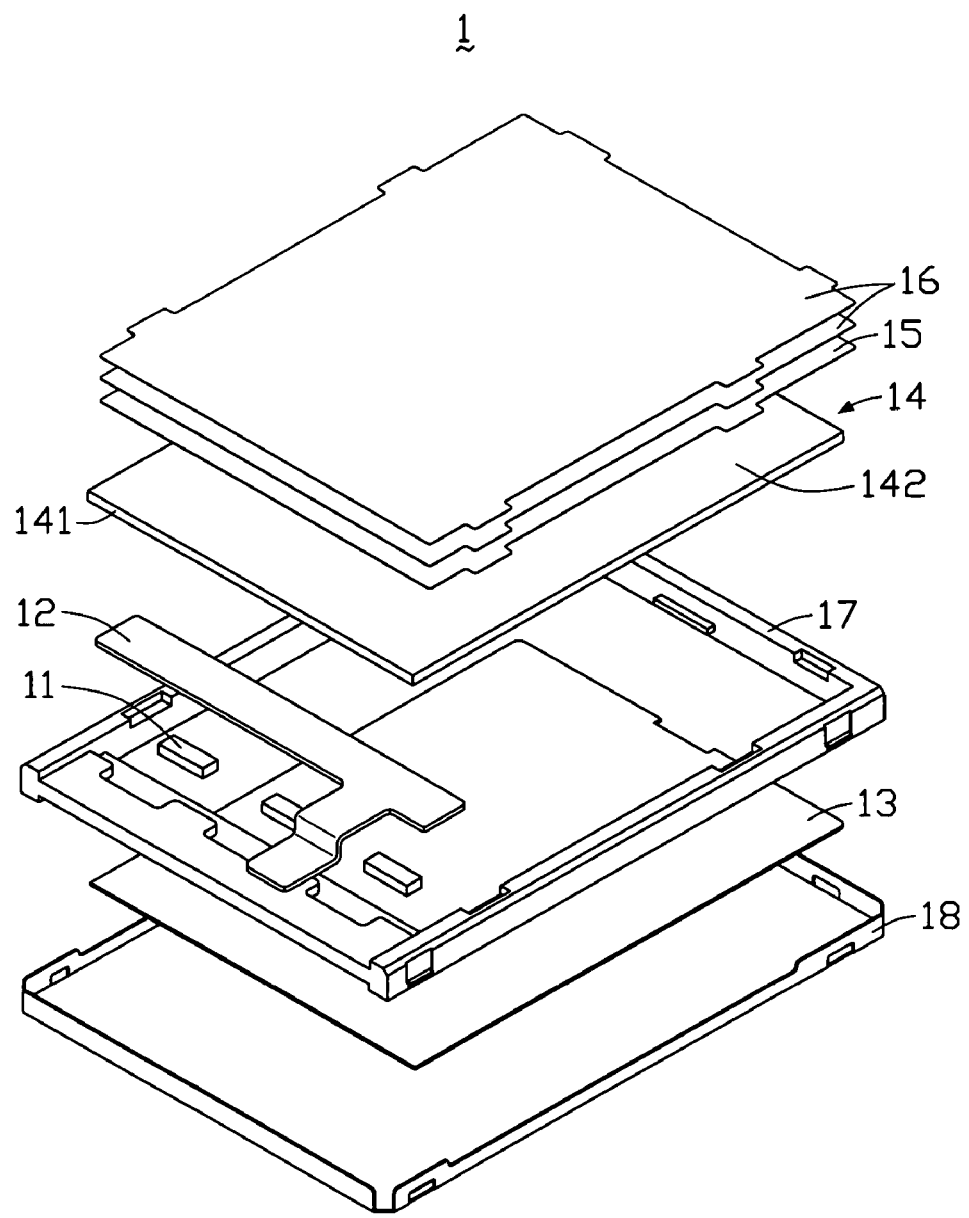
FIG. 9 is an exploded, isometric view of a conventional backlight module.

Referring to FIG. 7 and FIG. 8, a backlight module 6 according to a fifth embodiment of the present invention includes a light guide plate 64 and a circuit board 62. The light guide plate 64 includes a light emitting surface 648, two protrusions 644, and two side-blocks 646 The side-blocks 646 extend perpendicularly upwardly from two opposite lateral sides of the light emitting surface 648 respectively. The circuit board 62 defines two fixing holes 624 corresponding to the protrusions 644. The backlight module 6 further includes an optical film 662 disposed on the light emitting surface 648 of the light guide plate 64. The optical film 662 defines two cutouts (not labeled) in opposite lateral sides thereof respectively, the cutouts corresponding to the side-blocks 646. The light guide plate 64, the circuit board 62, and the optical film 662 are firmly fixed together by way of the protrusions 644 being engagingly received in the fixing holes 624, and the side-blocks 646 being engagingly received through the cutouts.

The side-blocks 646 and the cutouts enable the optical film 662 to be tightly held on the light guide plate 64 without gaps therebetween.

In alternative embodiments, the light guide plates 24, 34, 44, 54, 64 and the circuit boards 22, 32, 42, 52, 62 can be configured with grooves and protrusions respectively, with the grooves of the light guide plates 24-64 engagingly receiving the protrusions of the circuit boards 22-62. In further alternative or supplementary embodiments, the light guide plates 24-64 and the circuit boards 22-62 can be respectively fixed together by a bonding agent such as epoxy applied between the light guide plates 24-64 and the circuit boards 22-62.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
   a light guide plate having a light incident surface, a light emitting surface adjoining the light incident surface;
   a circuit board disposed adjacent to the light incident surface; and
   a fixing means attaching the circuit board and the light guide plate together, which comprises two ears formed with the light guide plate, and each ear comprises a protrusion;
   wherein the circuit board comprises two fixing holes corresponding to the protrusions.

2. The backlight module as claimed in claim 1, wherein the light guide plate further comprises a plurality of corner-blocks, each corner-block being formed with a corner of the light emitting surface.

3. The backlight module as claimed in claim 1, wherein the light guide plate further comprises two opposite side-blocks, each side-block perpendicularly extending from a respective side of the light emitting surface.

4. The backlight module as claimed in 3, further comprising an optical film defining two notches corresponding to the side-blocks.

5. The backlight module as claimed in claim 1, wherein the fixing means comprises two protrusions extending from two corners of the light emitting surface that are adjacent to the light incident surface.

6. The backlight module as claimed in claim 5, wherein the circuit board defines two fixing holes corresponding to the protrusions.

7. The backlight module as claimed in claim 6, wherein the fixing means comprises two fasteners.

8. The backlight module as claimed in claim 7, wherein the circuit board and the light guide plate each define two fixing holes corresponding to the fasteners.

9. The backlight module as claimed in claim 1, wherein the circuit board is a flexible printed circuit.

10. The backlight module as claimed in claim 1, wherein the circuit board is a printed circuit board.

* * * * *